United States Patent
Hayat Levi

(10) Patent No.: US 12,106,512 B2
(45) Date of Patent: Oct. 1, 2024

(54) METHOD AND APPARATUS FOR STRUCTURED LIGHT CALIBRATION

(71) Applicant: INUITIVE LTD., Ra'anana (IL)

(72) Inventor: Eliyahu Hayat Levi, Bat Shlomo (IL)

(73) Assignee: INUITIVE LTD., Ra'anana (IL)

( * ) Notice: Subject to any disclaimer, the term of this patent is extended or adjusted under 35 U.S.C. 154(b) by 70 days.

(21) Appl. No.: 17/816,218

(22) Filed: Jul. 29, 2022

(65) Prior Publication Data

US 2024/0037784 A1 Feb. 1, 2024

(51) Int. Cl.
| | |
|---|---|
| *G06T 7/73* | (2017.01) |
| *G06T 7/33* | (2017.01) |
| *G06T 7/521* | (2017.01) |
| *G06T 7/55* | (2017.01) |
| *G06V 10/24* | (2022.01) |

(52) U.S. Cl.
CPC ............... *G06T 7/74* (2017.01); *G06T 7/33* (2017.01); *G06T 7/521* (2017.01); *G06T 7/55* (2017.01); *G06V 10/24* (2022.01); *G06T 2207/20228* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 2014/0294290 A1* | 10/2014 | Appia | ...................... | G06T 7/80 |
| | | | | 382/154 |
| 2015/0381972 A1* | 12/2015 | Kowdle | ............... | H04N 9/3191 |
| | | | | 348/51 |
| 2018/0080766 A1* | 3/2018 | Johnson | .................... | G01C 3/08 |
| 2022/0118555 A1* | 4/2022 | Sibley | .................. | B23K 26/361 |

FOREIGN PATENT DOCUMENTS

| | | | | |
|---|---|---|---|---|
| CN | 111145342 A | * | 5/2020 | ............. G06T 17/00 |
| WO | WO-2021154269 A1 | * | 8/2021 | |

OTHER PUBLICATIONS

STIC provided English Machine Translation of CN111145342A (Year: 2020).*

* cited by examiner

Primary Examiner — Tyler W. Sullivan
(74) Attorney, Agent, or Firm — Browdy and Neimark, PLLC

(57) ABSTRACT

A method is provided for calibrating a structured light system. The structured light system comprises, a camera, a processor and a projector that emits light at an unknown pattern. According to this method, the projector emits an unknown pattern at two different distances relative to the camera's location, and the camera captures the pattern that was projected at the different distances
The processor then determines the vertical disparity between the two captured images and estimates a relative orientation between the camera and the projector. This estimation in turn is applied in the calibration of the structured light system.

3 Claims, 2 Drawing Sheets

METHOD AND APPARATUS FOR STRUCTURED LIGHT CALIBRATION

TECHNICAL FIELD

The present disclosure generally relates to methods for using optical devices, and more particularly, to the implementation of a structed light process in an optical system.

BACKGROUND

Structured light as known in the art, is a process of projecting a known pattern (often grids or horizontal bars) onto a scene. The way that the known pattern is deformed when striking surfaces allows vision systems to calculate the depth and surface information of the objects in the scene.

A 3D camera is an imaging device that enables the perception of depth in images to replicate three dimensions as through experienced human binocular vision. Some 3D cameras use two or more lenses to record multiple points of view, while others use a single lens that shift its position. The combination of the two perspectives, as with the slightly different perspective of two human eyes, enables depth perception. The principle behind the 3D effect is referred to as stereoscopy and the technology involved is known as stereoscopic imaging. The difference between objects seen through the left and right eyes (binocular disparity) enables perspective in human eyesight, along with accommodation through focusing and visual center interpretation to integrate those two perspectives.

However, one of the problems associated with the implementation of a structured light process, is, the calibration of the structured light system (which comprises at least one camera and pattern projector), without pre-assuming that the projected pattern is known, as prior art methods relate to the projector as if it were a camera, and consequently require that the image of the projected pattern is in the assumed projector image plane.

The present invention proposes a solution for overcoming this problem.

SUMMARY OF THE DISCLOSURE

The disclosure may be summarized by referring to the appended claims.

It is an object of the present disclosure to provide a method for calibrating a structured light system.

It is another object of the present disclosure to provide a method for calibrating a structured light system by projecting an unknown pattern at two or more different distances relative to the location of the system's image capturing sensor's location.

It is another object of the present disclosure to provide a method for calibrating a structured light system by estimating a relative orientation between the system's image capturing sensor and the projector.

Other objects of the present invention will become apparent from the following description.

According to a first embodiment of the disclosure, there is provided a method for calibrating a structured light system which comprises a projector configured to emit light at an unknown pattern (e.g., a point), at least one image capturing sensor configured to capture images, and at least one processor configured to operate on the images captured by the at least one image capturing sensor, wherein the method is characterized in that it comprises the steps of projecting by the projector one or more unknown patterns at at least two different distances relative to the at least one image capturing sensor's location, capturing by the image capturing sensor images of the patterns projected at the at least two different distances, determining vertical disparity between the at least two captured images and estimating a relative orientation between the at least one image capturing sensor and the projector, thereby enabling calibration of the structured light system.

According to another embodiment of the disclosure, the at least one image capturing sensor is a camera, and the relative orientation is parametrized (e.g., defined) by two angles that define a rotation of the camera relative to the projector's projection point, and the baseline distance, wherein the baseline distance is being the distance extending between the camera reference frame and the projector reference point.

In accordance with another embodiment of the present disclosure, the method comprises the steps of:

a) capturing at least two images by the at least one image capturing sensor of planar objects at at least two respective different distances extending form the at least one image capturing sensor to the planar objects;

b) processing data received from the at least two captured images and extracting key-points therefrom;

c) detecting matched extracted key-points retrieved from the at least two images; and d) estimating relative orientation between the at least one image capturing sensor and the projector, based on pair of matched extracted key-points.

BRIEF DESCRIPTION OF THE DRAWINGS

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Structured-light systems in which known patterns are projected by structured-light sensors onto a scene. The deformation of these known patterns as it appears to the sensor camera when the pattern strikes a surface, allows vision systems to calculate depth and surface information of the objects present in the scene. This method of depth reconstruction by a structured light system, taken together with an a priori knowledge of both projected pattern and scene geometry, allow calibrating a structured light system.

However, the problem arises when one needs to calibrate structured-light systems in which the patterns that are projected by structured-light sensors (projectors) onto a scene are unknown, and consequently there is no way to calculate depth of the objects present in the scene in order to calibrate this system, as in the case where known patterns are projected.

The present invention proposes a solution to the above problem. By the proposed solution, the motion of the image of an unknown pattern (e.g.,) a point projected from the projector on two planes (at two different distances) is a horizontal shift, in the case of a calibrated structured light system). In case that the system is not calibrated, a vertical shift would appear. This principle enables estimating a relative orientation between an image capturing device (e.g., a camera) and the projector by measuring the vertical disparity between two (or more) images that are taken by the image capturing device at different distances. By the proposed method, the projector is considered as a point and therefore does not require projecting a pattern image.

Figure 1A:
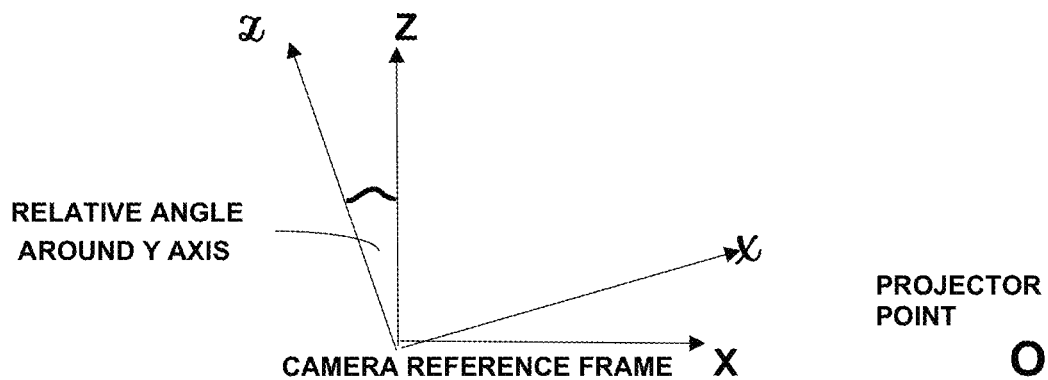
FIG. 1A—illustrates a relative orientation angle around Y axis, where the angle defined between a given structured light system state ($\mathcal{X}$, $\mathcal{Z}$) its calibrated state (X,Z)
Figure 1B:
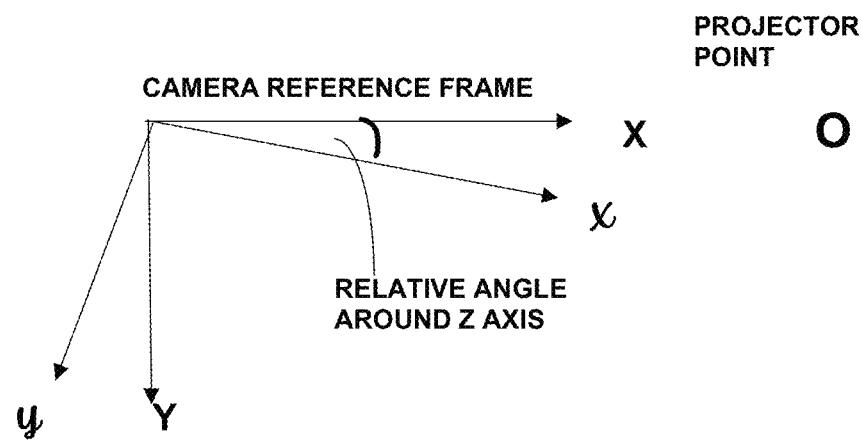
FIG. 1B—illustrates a relative orientation angle around Z axis, where the angle is defined between a given structured light system state ($\mathcal{X}$, $\mathcal{Y}$) to its calibrated state (X,Y)

The mathematical model for determining relative orientation between a camera and a projector of the structured light system comprises unknown parameters, namely, two angles by which the rotation of the camera reference system is defined, wherein the camera's X axis points towards the projector's focal point, and the baseline distance. FIG. 1A illustrates a relative orientation angle around Y axis, which is defined between a given structured light system state ($\mathcal{X}$, $\mathcal{Z}$) to its calibrated state (X,Z), whereas FIG. 1B illustrates a relative orientation angle around Z axis, where the angle is defined between a given structured light system state ($\mathcal{X}$, $\mathcal{Y}$) to its calibrated state (X,Y).

Figure 2:
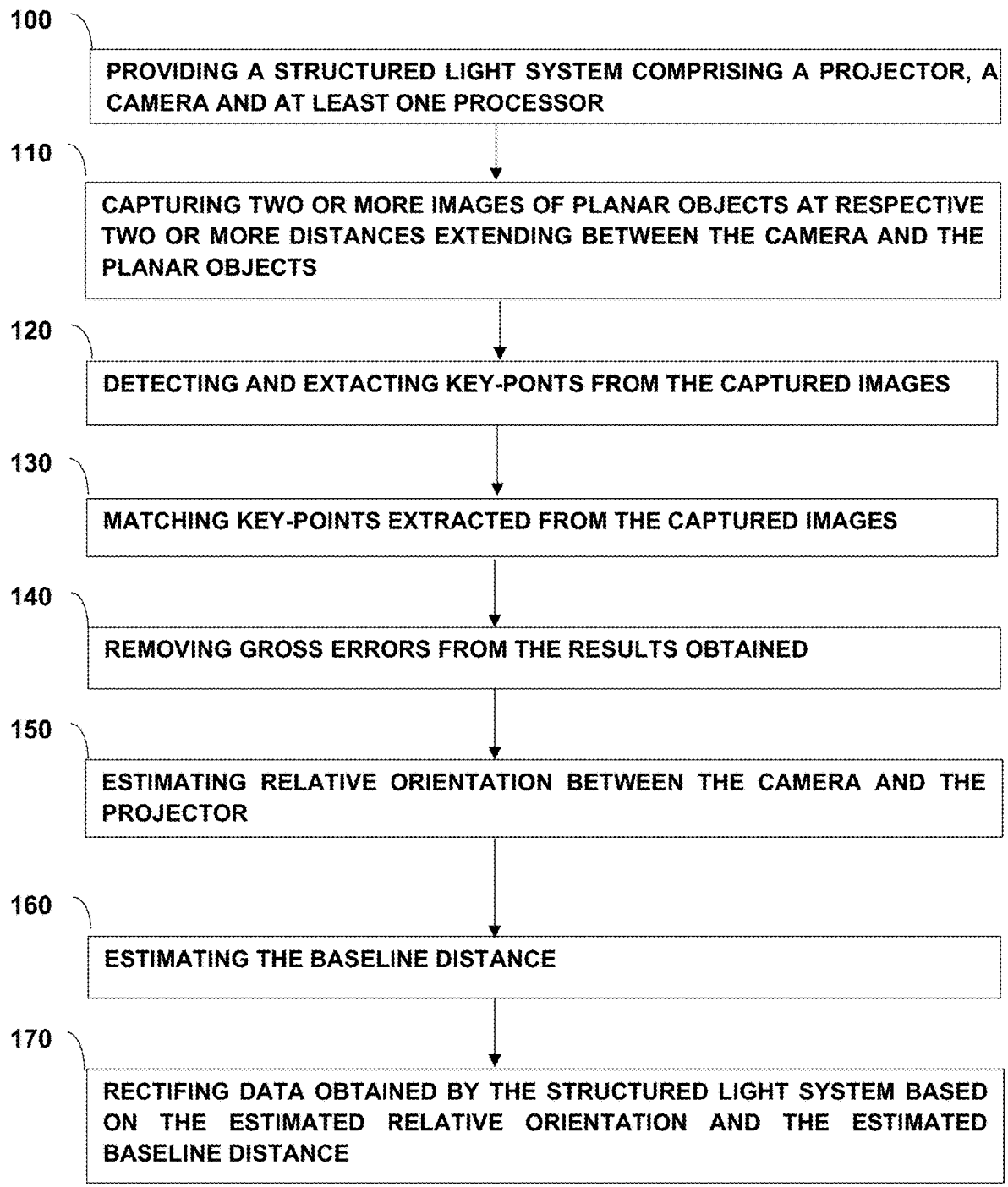
FIG. 2—exemplifies an embodiment construed in accordance with the present invention for carrying out the calibration process.

FIG. 2 exemplifies an embodiment construed in accordance with the present invention for carrying out the calibration process. The assumptions applied for the proposed calibration method are the following:

a) the captured scene geometry is planar;
b) the images are captured by the camera at known distances that extend between the camera and the plane; and
c) the camera's intrinsic parameters are known in advanced.

The calibration process exemplified in FIG. 2 is the following: providing a structured light system (100) that comprises a projector configured to emit light at an unknown pattern, a camera, and a processor configured to operate on images captured by the camera.

In step 110, two or more images of planar objects are captured. The two or more images are captured at respective two or more distances extending between the camera and the planar objects.

Next, detecting and extracting key-points from the captured images (step 120), wherein key-point detection refers to locating key parts of the planar objects comprised in the captured images.

In the following step (step 130), the extracted key-points from the different captured images are matched. This matching may be carried out for example by searching highly correlated windows in a limited searching strip.

Gross errors are then removed (step 140) by using any applicable method known in the art per se, such as by using Random Sample Consensus ("RANSAC") method with the relative orientation model (only 2 angles). RANSAC is an iterative method that is used to estimate parameters of a mathematical model from a set of observed data that contains outliers, when outliers are to be accorded no influence on the values of the estimates. It is a non-deterministic algorithm in the sense that it produces a reasonable result only with a certain probability, with this probability increasing as more iterations are allowed.

In the following step (step 150) the relative orientation between the camera and the projector is estimated by the processor, using information derived from matching the key-points, followed by estimating the baseline distance (step 160) by the processor while relying on the known distances extending from the planar objects, and by relying on results obtained in the preceding iterative step.

Finally, the estimated relative orientation and the estimated baseline distance are applied by the processor in the calibration of the structured light system (step 170).

Obviously, in case that the baseline distance is known, the captured scene can be any scene without any geometric constraints such as the requirement for planar objects.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for calibrating a structured light system, the structured light system comprising a structured-light sensor that emits light at an unknown pattern, at least one camera that captures a plurality of images and at least one processor that operates on the plurality of images captured by the at least one camera, the method comprising:
    projecting by the structured-light sensor one or more unknown patterns at at least two different distances relative to a location of the at least one camera,
    capturing by the at least one camera the images of the one or more unknown patterns projected at the at least two different distances,
    determining by the processor vertical disparity between the at least two captured images and estimating by the processor a relative orientation between the at least one camera and the structured-light sensor, and
    using by the processor that estimation for calibrating the structured light system.

2. The method of claim 1, wherein said relative orientation is parametrized by two angles that define a rotation of the at least one camera relative to the structured-light sensor's projection point and the baseline distance.

3. The method of claim 1, comprising:
    a) capturing at least two images by the at least one camera of planar objects at at least two respective different distances extending from said at least one camera to the planar objects;

b) processing, by the processor, data received from the at least two captured images and extracting key-points therefrom;
c) detecting, by the processor, matched extracted key-points retrieved from the at least two images; and
d) estimating, by the processor, relative orientation between the at least one camera and the structured-light sensor, based on pair of matched extracted key-points.

* * * * *